April 3, 1934. V. M. SMITH 1,953,197
ENGINE
Filed March 25, 1931
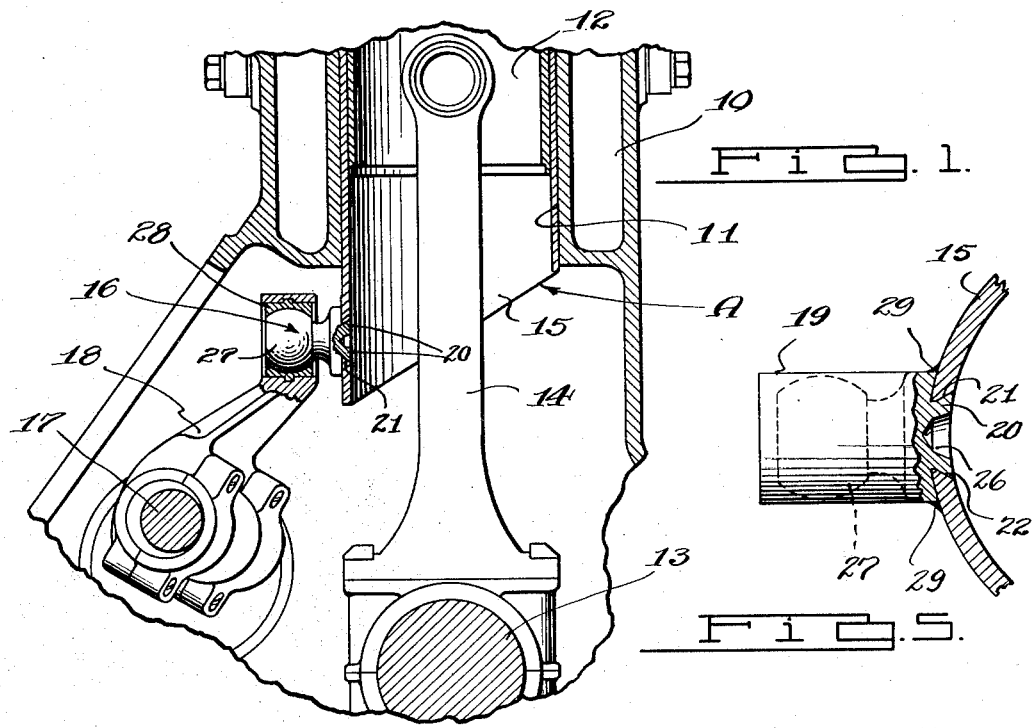
Fig. 1.
Fig. 5.
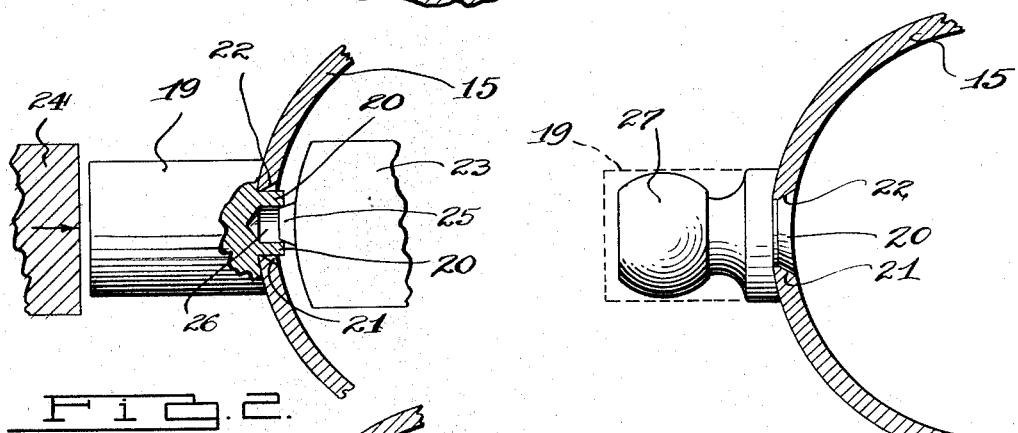
Fig. 2.
Fig. 4.
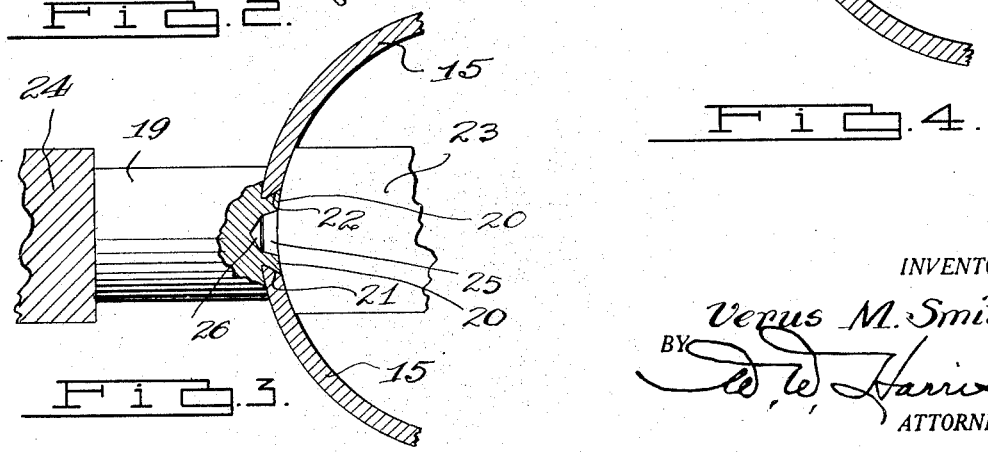
Fig. 3.
INVENTOR.
Verus M. Smith
BY
ATTORNEY.

Patented Apr. 3, 1934

1,953,197

UNITED STATES PATENT OFFICE 1,953,197

ENGINE

Verus M. Smith, Grosse Pointe, Mich., assignor to Continental Motors Corporation, Detroit, Mich., a corporation of Virginia Application March 25, 1931, Serial No. 525,119

14 Claims. (Cl. 123—81)

My invention relates to internal combustion engines of the sleeve valve type and is more particularly related to the sleeve valve structure and the method of making same.

In engines of the sleeve valve type it has been customary to employ cast iron sleeves having sleeve valve actuating elements integrally carried thereby, but it has been found that steel sleeves may be constructed for such engines with a considerable saving in weight. However on using steel sleeves, the sleeve valve actuating elements are preferably constructed of separate members and then attached or otherwise united to the steel sleeve. My invention relates in its specific aspect to a built-up sleeve valve structure employing a steel sleeve and a separate sleeve valve actuating element secured thereto.

It is an object of my invention to provide an engine of the sleeve valve type employing a sleeve valve structure whereby an improved operation may be obtained, and in which wear and breakage is reduced to a minimum. A further object of my invention is to provide an improved built-up sleeve valve structure that may be more economically manufactured in production and which may be readily and quickly manufactured and assembled with an engine with a minimum of time and labor.

For a more detailed understanding of my invention, reference may be had to the accompanying drawing which illustrates one form which my invention may assume, and in which:

Figure 1 is a fragmentary vertical sectional view of an engine of the sleeve valve type employing a sleeve valve structure constructed in accordance with my invention, Figure 2 is a detailed view partly in section illustrating the first step in attaching the sleeve valve actuating element to a steel sleeve, Figure 3 is a similar detailed sectional view illustrating a further step in the assembly of said element with the sleeve, Figure 4 is a similar detailed view showing the final operation in machining the sleeve valve actuating element, and Figure 5 is a similar detailed sectional view of a modified form of construction illustrating how said element may be mechanically attached to the steel sleeve by a coining operation and by welding.

The built up sleeve valve structure illustrated in the accompanying drawing is preferably employed with an internal combustion engine and in general consists of a cylinder block 10 having a cylinder bore 11 constructed to receive a sleeve valve structure A. A piston 12 operates within the cylinder and preferably reciprocates within the sleeve valve structure and is connected with the crankshaft 13 by means of the connecting rod 14.

The sleeve valve structure A is preferably built-up of a steel sleeve 15 and a sleeve valve actuating element 16 which is adapted to be secured to said steel sleeve. As illustrated in the drawing, I have employed a single sleeve valve of the Burt-McCollum type which is given a combined reciprocating and oscillating movement with respect to the cylinder and sleeve axes whereby any point of said sleeve traverses a closed path. Obviously my invention may be incorporated in a sleeve valve structure other than the single sleeve valve type as illustrated and it will be understood that I am not limited to any specific type of sleeve valve.

The combined reciprocating and oscillating movement may be given to the sleeve by any suitable sleeve driving mechanism and the drawing shows one means by which a sleeve valve structure may be operated, this means comprising a wobble crank 17 which is operatively connected with the engine crankshaft by any suitable driving mechanism and actuates the arms 18 which are connected with the sleeve valve actuating elements 16. Preferably the connection between the element 16 and the arm 18 consists of a ball and socket joint constructed in the usual manner and it is immaterial whether the ball be carried by the arm or by the sleeve valve actuating element. In the illustrated embodiment of my invention I have shown a sleeve valve actuating element which preferably consists of a blank 19 having a deformable portion 20 which is adapted to project within a window or opening 21 carried by the sleeve or body element 15. Preferably the window 21 in the sleeve is undercut as at 22 and the deformable portion of the sleeve valve actuating element is arranged to be expanded or otherwise deformed into engagement with the undercut sides of the window 21 in the sleeve 15 to thereby lock the sleeve valve actuating element to the sleeve. Preferably this blank 19 is united to the sleeve under pressure, suitable dies 23 and 24 being employed to expand the deformable portion 20 of the actuating element into locking engagement with the sleeve as shown in Figure 3. It will be noted that the die 23 is provided with a projection 25 which is preferably tapered and arranged to project within the axial recesses 26 carried by the deformable portion 20 on the actuating element. This means of uniting two members together is referred to as a coining operation and this means of uniting the actuating element to the sleeve provides a very rigid joint between the actuating element and sleeve which is not easily broken and forms a rigid connection capable of withstanding the excessive loads to which said actuating element is subjected in operating the sleeve. After the actuating element has been secured to said sleeve the actuating element may be machined as shown in Figure 4 to form a ball 27 which is adapted to be swivelly engaged within a ball socket 28 carried by the arm 18. If desired this sleeve valve actuating element may be welded to the sleeve as at 29 to provide further means for uniting said actuating element to this sleeve in addition to the coining operation as above described.

It will be thus noted that I have provided a built-up sleeve structure which may be readily and economically manufactured in production since in most cases a single operation will be sufficient to unite the actuating element to said sleeve. Furthermore, such a construction as I have illustrated in the accompanying drawing provides a sleeve valve actuating element which is arranged to be positioned a minimum distance from the sleeve axis thereby permitting the construction of a compact engine structure which permits the locating of the wobble shaft axis a minimum distance from the crankshaft axis.

Although I have illustrated but one form of my invention and have described in detail but a single application thereof, it will be apparent to those skilled in the art to which my invention pertains that various modifications and changes may be made therein without departing from the spirit of my invention or from the scope of the appended claims.

What I claim as my invention is:

1. A built up sleeve valve structure for a sleeve valve engine and including a sleeve, and a sleeve valve actuating element secured thereto by a coining operation substantially in the plane of said sleeve.

2. A built up sleeve valve structure for a sleeve valve engine and including a sleeve, and a sleeve valve actuating element secured thereto by locking a portion of said element to said sleeve by a coining operation substantially in the plane of the sleeve.

3. A built up sleeve valve structure for a sleeve valve engine and including a sleeve having a window, and a sleeve valve actuating element having a portion extending within said window and interlocked with said sleeve substantially in the plane of the sleeve.

4. A built up sleeve valve structure for a sleeve valve engine and including a sleeve, and a sleeve valve actuating element having a deformable portion coined to said sleeve substantially in the plane thereof.

5. A built up sleeve valve structure for a sleeve valve engine and including a sleeve, and a sleeve valve actuating element having a deformable portion adapted to be interlocked with said sleeve substantially in the plane thereof.

6. A built up sleeve valve structure for a sleeve valve engine and including a sleeve, and a sleeve valve actuating element said sleeve having a recess, the said actuating element having a deformable portion adapted to be deformed under pressure into locking engagement within said sleeve recess and positioned in substantially the plane of the sleeve.

7. A built up sleeve valve structure for a sleeve valve engine and including a sleeve, and a sleeve valve actuating element having a deformable portion, said sleeve having an undercut recess adapted for receiving the deformable portion of said sleeve valve actuating element, said deformable portion positioned substantially in the plane of the sleeve and deformed under pressure into engagement with said undercut recess to lock said element to said sleeve.

8. A built up sleeve valve structure for a sleeve valve engine and including a sleeve provided with a window and having undercut window edges, and a sleeve valve actuating element having a deformable portion adapted to be projected within said window and expanded under pressure substantially in the plane of the sleeve into locking engagement with the undercut window edges thereof.

9. A built up sleeve valve structure for a sleeve valve engine and including a sleeve, and a sleeve valve actuating element projecting from said sleeve and provided with a base portion coined to said sleeve substantially in the plane of the sleeve.

10. A built up sleeve valve structure for a sleeve valve engine and including a sleeve having a window, and a sleeve valve actuating element provided with a reduced end portion adapted to be projected within said window and expanded substantially in the plane of the sleeve into engagement with the edges of said window to lock said element to said sleeve.

11. A built up sleeve valve structure for a sleeve valve engine and including a sleeve having a window, and a sleeve valve actuating element provided with a reduced end portion adapted to be projected within said window and expanded substantially in the plane of the sleeve into engagement with the edges of said window to lock said element to said sleeve, the reduced end portion of said element forming a shoulder adapted to overlap the outer face of the sleeve.

12. A built up sleeve valve structure for a sleeve valve engine and including a sleeve, and a sleeve valve actuating element coined and welded to said sleeve substantially in the plane of the sleeve.

13. A built up sleeve valve structure for a sleeve valve engine and including a sleeve having a window, and a sleeve valve actuating element provided with a reduced end portion adapted to be projected within said window and expanded substantially in the plane of the sleeve into engagement with the edges of said window to lock said element to said sleeve, the reduced end portion of said element forming a shoulder adapted to overlap the outer face of the sleeve and welded thereto.

14. A built up sleeve valve structure for a sleeve valve engine and including a sleeve having a window, and a sleeve valve actuating element provided with a reduced end portion adapted to be projected within said window and expanded into engagement with the edges of said window to lock said element to said sleeve, the reduced end portion of said element forming a shoulder adapted to overlap the outer face of the sleeve and welded to the exterior face of said sleeve.

VERUS M. SMITH.